US012573025B2

(12) United States Patent　　(10) Patent No.:　US 12,573,025 B2

Gong et al.　　(45) Date of Patent:　Mar. 10, 2026

---

(54) CELL ALIGNMENT METRIC DETECTION METHOD, CONTROLLER, DETECTION SYSTEM AND STORAGE MEDIUM

(71) Applicant: Guangdong Lyric Robot Automation Co., Ltd., Huizhou (CN)

(72) Inventors: Yazhong Gong, Huizhou (CN); Jun Zeng, Huizhou (CN); Yang Ruan, Huizhou (CN)

(73) Assignee: Guangdong Lyric Robot Automation Co., Ltd., Huizhou (CN)

( * ) Notice: Subject to any disclaimer, the term of this patent is extended or adjusted under 35 U.S.C. 154(b) by 504 days.

(21) Appl. No.: 18/013,319

(22) PCT Filed: Nov. 14, 2022

(86) PCT No.: PCT/CN2022/131592
　§ 371 (c)(1),
　(2) Date: Dec. 28, 2022

(87) PCT Pub. No.: WO2024/065976
　PCT Pub. Date: Apr. 4, 2024

(65) Prior Publication Data
　US 2024/0265521 A1　Aug. 8, 2024

(30) Foreign Application Priority Data

Sep. 28, 2022　(CN) .......................... 202211191323.4

(51) Int. Cl.
　*G06T 7/00*　　(2017.01)
　*G06T 7/73*　　(2017.01)
　(Continued)
(52) U.S. Cl.
　CPC ............... *G06T 7/001* (2013.01); *G06T 7/74* (2017.01); *G06V 10/25* (2022.01); *G06V 10/44* (2022.01);
　(Continued)

(58) Field of Classification Search
　CPC . G06T 7/001; G06T 7/74; G06T 2207/20081; G06T 2207/30108; G06T 2207/30242; G06V 10/25; G06V 10/44
　See application file for complete search history.

(56) References Cited

U.S. PATENT DOCUMENTS

| | | | |
|---|---|---|---|
| 9,483,819 B2 * | 11/2016 | Chen | .................. G01N 23/2251 |
| 2021/0104066 A1 | 4/2021 | Haeusler | |
| 2022/0198698 A1 | 6/2022 | Liu et al. | |

FOREIGN PATENT DOCUMENTS

| | | |
|---|---|---|
| CN | 110287950 A | 9/2019 |
| CN | 110472638 A | 11/2019 |

(Continued)

OTHER PUBLICATIONS

International Search Report and Written Opinion dated May 16, 2023 from International Application No. PCT/CN2022/131592.
Supplementary European Search Report dated Jul. 16, 2024 from EP Application No. 22826639.1.

*Primary Examiner* — Pinalben Patel

(74) *Attorney, Agent, or Firm* — Daylight Law, P.C.

(57)　　ABSTRACT

A cell alignment metric detection method, a controller, a detection system and a storage medium are disclosed. The cell alignment metric detection method includes: acquiring a first cell image; inputting the first cell image into a first training model for detection processing to obtain a region of interest; obtaining a second cell image and terminal position information of a second electrode plate according to the region of interest and the first cell image; inputting the second cell image into a second training model for separation processing to obtain a third cell image and terminal position information of a first electrode plate; performing image extraction and analysis on the third cell image to obtain a misalignment quantity; and obtaining the cell alignment metric according to the terminal position infor- (Continued)

mation of the second electrode plate and the first electrode plate and the misalignment quantity.

16 Claims, 7 Drawing Sheets

(51) Int. Cl.
  *G06V 10/25*    (2022.01)
  *G06V 10/44*    (2022.01)
(52) U.S. Cl.
  CPC ............... *G06T 2207/20081* (2013.01); *G06T*
     *2207/30108* (2013.01); *G06T 2207/30242*
                (2013.01)

(56)       References Cited

FOREIGN PATENT DOCUMENTS

| CN | 111753692 | A | | 10/2020 | | |
|----|-----------|---|---|---------|---|---|
| CN | 109859186 | B | * | 12/2020 | | |
| CN | 112053326 | A | | 12/2020 | | |
| CN | 112330623 | A | | 2/2021 | | |
| CN | 112465814 | A | * | 3/2021 | ........... | G06K 9/6256 |
| CN | 112508838 | A | | 3/2021 | | |
| CN | 109239075 | B | * | 11/2021 | ............ | G01N 21/88 |
| CN | 113654493 | A | | 11/2021 | | |
| CN | 114581446 | A | | 6/2022 | | |
| CN | 114894821 | A | | 8/2022 | | |
| JP | 2017135019 | A | * | 8/2017 | | |
| JP | 2018087740 | A | | 6/2018 | | |

* cited by examiner

CELL ALIGNMENT METRIC DETECTION METHOD, CONTROLLER, DETECTION SYSTEM AND STORAGE MEDIUM

CROSS-REFERENCE TO RELATED APPLICATION

This application is a national stage filing under 35 U.S.C. § 371 of international application number PCT/CN2022/131592, filed Nov. 14, 2022, which claims priority to Chinese patent application No. 202211191323.4 filed Sep. 28, 2022. The contents of these applications are incorporated herein by reference in their entirety for all purposes.

BACKGROUND

At present, on a cell production line, electrode plate alignment metric detection needs to be performed on a cell. In the existing technology, nondestructive detection is generally performed on the cell by using an x-ray detection device. Although nondestructive detection can be achieved by the x-ray detection device, positions of a positive plate and a negative plate cannot be accurately positioned by using the detection method, thereby causing the problem of inaccurate cell alignment metric detection of the cell.

SUMMARY

The following is a summary of the subject detailed herein. This summary is not intended to limit the protection scope of the claims.

The present disclosure relates to, but is not limited to, the field of automation, in particular to a cell alignment metric detection method, a controller, a detection system and a storage medium.

Embodiments of the present disclosure mainly aim to provide a cell alignment metric detection method, a controller, a detection system and a storage medium, which can effectively improve the accuracy of cell alignment metric detection.

In a first aspect, embodiments of the present disclosure provide a cell alignment metric detection method, comprising:

acquiring a first cell image, wherein the first cell image is a cell image in which a first electrode plate and a second electrode plate are alternately laminated;

inputting the first cell image into a first training model for detection processing to obtain a region of interest, wherein the region of interest is a region formed by a different part of the first electrode plate relative to the second electrode plate;

obtaining a second cell image and terminal position information of the second electrode plate according to the region of interest and the first cell image;

inputting the second cell image into a second training model for separation processing to obtain a third cell image and obtaining terminal position information of the first electrode plate according to the third cell image and the first cell image;

performing image extraction and analysis on the third cell image to obtain a misalignment quantity between the first electrode plate and the adjacent second electrode plate; and obtaining the cell alignment metric according to the terminal position information of the second electrode plate, the terminal position information of the first electrode plate and the misalignment quantity.

In an embodiment, performing the image extraction and analysis on the third cell image to obtain the misalignment quantity between the first electrode plate and the adjacent second electrode plate comprises:

performing image extraction on the third cell image to obtain a circumscribed rectangle of each first electrode plate in the third cell image; and obtaining the misalignment quantity between the first electrode plate and the adjacent second electrode plate according to the circumscribed rectangle.

In an embodiment, performing the image extraction on the third cell image to obtain the circumscribed rectangle of each first electrode plate in the third cell image comprises:

performing image contour extraction on the third cell image to obtain a contour of each first electrode plate in the third cell image; and generating the circumscribed rectangle corresponding to the contour of the first electrode plate according to the contour of the first electrode plate.

In an embodiment, obtaining the misalignment quantity between the first electrode plate and the adjacent second electrode plate according to the circumscribed rectangle comprises:

determining a target point according to the circumscribed rectangle; and calculating to obtain the misalignment quantity between the first electrode plate and the adjacent electrode plate corresponding to the circumscribed rectangle according to position information corresponding to the target point.

In an embodiment, determining the target point according to the circumscribed rectangle comprises:

determining vertex position information of the circumscribed rectangle according to the circumscribed rectangle;

determining midpoint position information of two target edges of the circumscribed rectangle according to the vertex position information, wherein a direction of the target edges is the same as a laminating direction of the first electrode plate and the second electrode plate; and determining the midpoint position information as the target point.

In an embodiment, after performing the image contour extraction on the third cell image to obtain the contour of each first electrode plate in the third cell image, the method further comprises:

labeling the contour of the first electrode plate to obtain a number of the first electrode plate;

obtaining a number of the second electrode plate according to the number of the first electrode plate; and obtaining a total number of electrode plates of the cell in the first cell image according to the number of the first electrode plate and the number of the second electrode plate.

In an embodiment, obtaining the second cell image according to the region of interest and the first cell image comprises:

filtering the region of interest to obtain a filtered region of interest;

acquiring a maximum contour of the filtered region of interest, and performing image inversion processing on the region of interest to obtain the region of interest after image inversion; and performing bitwise OR operation on the region of interest after image inversion and the first cell image to obtain the second cell image.

In an embodiment, before acquiring the first cell image, the method comprises:

acquiring a target detection image;

intercepting the target detection image to obtain a detection processing region; and rotating the detection processing region to obtain the first cell image.

In an embodiment, before acquiring the target detection image, the method comprises:

acquiring an initial image set obtained by shooting a cell through an image acquisition module; and performing average gray judgment processing on initial images of the initial image set to obtain the target detection image.

In a second aspect, embodiments of the present disclosure provide a controller, comprising: a memory, a processor and a computer program stored on the memory and operatable on the processor, wherein the processor, when executing the program, implements the cell alignment metric detection method in the first aspect above.

In a third aspect, embodiments of the present disclosure provide a detection system, wherein the detection system comprises the controller in the second aspect.

In a fourth aspect, embodiments of the present disclosure provide a computer-readable storage medium storing a computer-executable instruction, wherein the computer-executable instruction is used for performing the cell alignment metric detection method in the first aspect.

The present disclosure has the following beneficial effects. The cell alignment metric detection method includes: acquiring the first cell image, wherein the first cell image is the cell image in which the first electrode plate and the second electrode plate are alternately laminated; inputting the first cell image into the first training model for detection processing to obtain the region of interest, wherein the region of interest is the region formed by the different part of the first electrode plate relative to the second electrode plate; obtaining the second cell image and the terminal position information of the second electrode plate according to the region of interest and the first cell image; inputting the second cell image into the second training model for separation processing to obtain the third cell image and obtaining the terminal position information of the first electrode plate according to the third cell image and the first cell image; performing image extraction and analysis on the third cell image to obtain the misalignment quantity between the first electrode plate and the adjacent second electrode plate; and obtaining the cell alignment metric according to the terminal position information of the second electrode plate and the first electrode plate and the misalignment quantity. In the technical solution of this embodiment, by processing the first cell image through the first training model and the second training model, the positions of the positive plate and the negative plate can be accurately positioned, that is, the accurate terminal position information of the second electrode plate, terminal position information of the first electrode plate and misalignment quantity of the first electrode plate and the second electrode plate can be obtained from the first cell image, so that the accuracy of cell alignment metric detection can be effectively improved.

Other features and advantages of the present disclosure will be elaborated in the following description, and will be partially obvious from the description, or may be learned by practice of the present disclosure. The objects and other advantages of the present disclosure may be realized and attained by the structure particularly pointed out in the description, claims, and the appended drawings.

DETAILED DESCRIPTION

Figure 1:
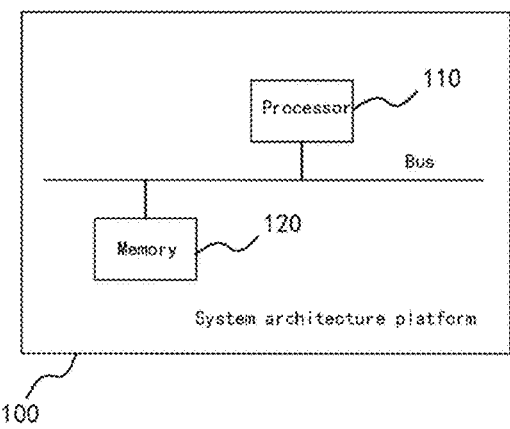
FIG. 1 is a schematic diagram of a system architecture for executing a cell alignment metric detection method provided by an embodiment of the present disclosure.

To make the objects, technical solutions, and advantages of the present disclosure clearer, the present disclosure will be further described in details hereinafter with reference to the accompanying drawings and embodiments. It should be understood that the specific embodiments described herein are only used to explain the present disclosure, but are not intended to limit the present disclosure.

It should be noted that although functional modules are divided in a schematic diagram of a device and a logical sequence is shown in a flow chart, in some cases, steps shown or described may be executed in a different order from the module division in the device or the sequence in the flow chart. The terms "first", "second" and the like in the specification and claims as well as the above drawings are used to distinguish between similar objects, and are not necessarily used to describe a specific sequence or a chronological order.

At present, on a cell production line, electrode plate alignment metric detection needs to be performed on a cell. In the existing technology, nondestructive detection is generally performed on the cell by using an x-ray detection device. Although nondestructive detection can be achieved by the x-ray detection device, positions of a positive plate and a negative plate cannot be accurately positioned by using the detection method, thereby causing the problem of inaccurate cell alignment metric detection of the cell.

In order to solve the problem above in the existing technology, the embodiments of the present disclosure provide a cell alignment metric detection method, a controller, a detection system and a storage medium. The cell alignment metric detection method at least comprises: acquiring a first cell image, wherein the first cell image is a cell image in which a first electrode plate and a second electrode plate are alternately laminated; inputting the first cell image into a first training model for detection processing to obtain a region of interest, wherein the region of interest is a region formed by a different part of the first electrode plate relative to the second electrode plate; obtaining a second cell image and terminal position information of a second electrode plate according to the region of interest and the first cell image; inputting the second cell image into a second training model for separation processing to obtain a third cell image and obtaining terminal position information of the first electrode plate according to the third cell image and the first cell image; performing image extraction and analysis on the third cell image to obtain a misalignment quantity between the first electrode plate and the adjacent second electrode plate; and obtaining the cell alignment metric according to the terminal position information of the second electrode plate and the first electrode plate and the misalignment quantity.

In the technical solution of this embodiment, by processing the first cell image through the first training model and the second training model, the positions of the positive plate and the negative plate can be accurately positioned, that is, the accurate terminal position information of the second electrode plate, terminal position information of the first electrode plate and misalignment quantity of the first electrode plate and the second electrode plate can be obtained from the first cell image, so that an accuracy of cell alignment metric detection can be effectively improved.

The embodiments of the present disclosure are further described below with reference to the accompanying drawings.

As shown in FIG. 1, FIG. 1 is a schematic diagram of a system architecture platform 100 for executing a cell alignment metric detection method provided by an embodiment of the present disclosure.

In the example of FIG. 1, the system architecture platform 100 is provided with a processor 110 and a memory 120, wherein the processor 110 and the memory 120 may be connected by a bus or other means, and the bus connection is taken as an example in FIG. 1.

As a non-transient computer-readable storage medium, the memory 120 may be used to store non-transient software programs and non-transient computer-executable programs. In addition, the memory 120 may comprise a high-speed random access memory, and may also comprise a non-transitory memory, such as at least one disk memory device, a flash memory device, or other non-transitory solid storage devices. In some embodiments, the memory 120 optionally comprises a memory remotely disposed with respect to the processor 110, which may be connected to the system architecture platform 100 through a network. Examples of the networks above comprise, but are not limited to, the Internet, intranet, local area networks, mobile communication networks, or combinations thereof.

The system architecture platform may be a programmable controller, or may be other controllers, which are not specifically limited herein.

Those of ordinary skills in the art can understand that the system architecture platform shown in FIG. 1 does not constitute a limitation to the embodiments of the present application, and may include more or less components than the illustrated components, or combine some components, or have different component arrangements.

On the basis of the above-mentioned system architecture platform, various embodiments of the cell alignment metric detection method according to the present disclosure are proposed below.

Figure 2:
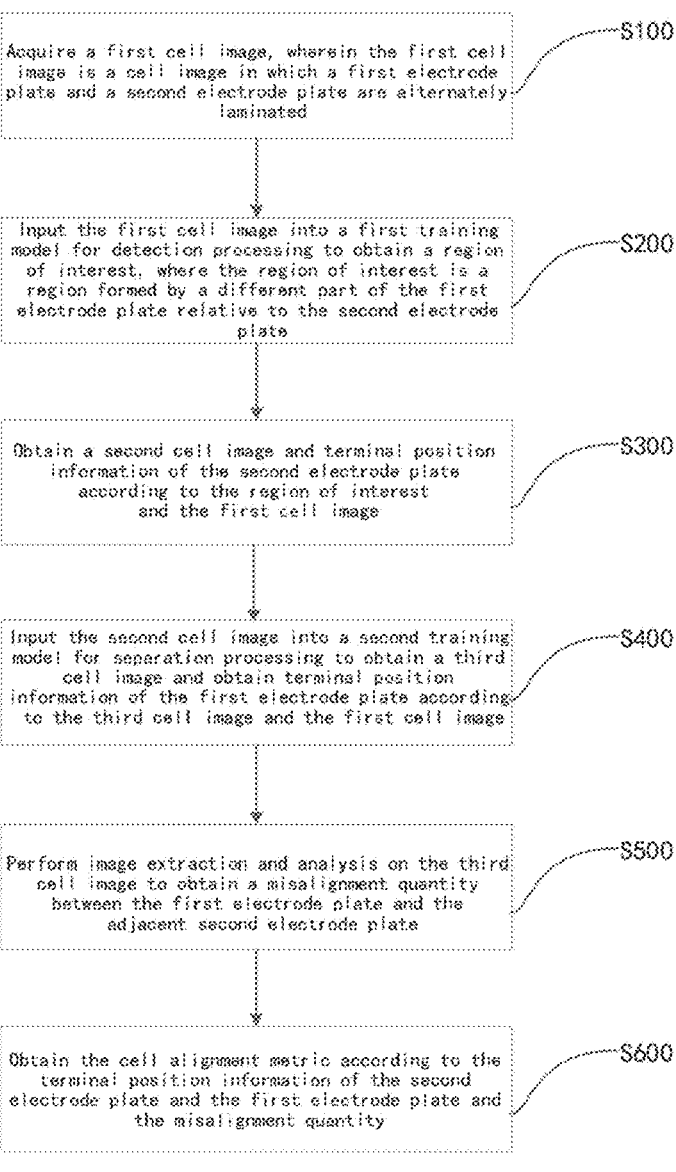
FIG. 2 is a flow chart of a cell alignment metric detection method provided by an embodiment of the present disclosure.

As shown in FIG. 2, FIG. 2 is a flowchart of a cell alignment metric detection method provided by an embodiment of the present disclosure. The cell alignment metric detection method of the embodiments of the present disclosure may comprise, but is not limited to, step S100, step S200, step S300, step S400, step S500 and step S600.

At step S100, a first cell image is acquired, wherein the first cell image is a cell image in which a first electrode plate and a second electrode plate are alternately laminated.

Specifically, when the cell alignment metric needs to be detected, a first cell image of a cell to be detected may be acquired. The cell to be detected comprises a plurality of first electrode plates and a plurality of second electrode plates. The first electrode plates and the electrode plates are alternately laminated, and generally, a length of the first electrode plate is different from a length of the second electrode plate, so that the first electrode plate may partially protrude from the second electrode plate when the length of the first electrode plate is longer than the length of the second electrode plate.

It should be noted that the first cell image may be a preprocessed cell image or an unprocessed cell image, which is not specifically limited in this embodiment.

It should be noted that a polarity of the first electrode plate is different from a polarity of the second electrode plate, and the first electrode plate may be positive and the second electrode plate may be negative, or the first electrode plate may be negative and the second electrode plate may be positive, which is not specifically limited in this embodiment.

In an embodiment, in the first cell image, the first electrode plate is a positive plate, the second electrode plate is a negative plate, and a length of the negative plate is longer than that of the positive plate, and the positive plate and the negative plate are alternately laminated on the first cell image, and the number of the positive plate is one less than that of the negative plate.

At step S200, the first cell image is input into a first training model for detection processing to obtain a region of interest, wherein the region of interest is a region formed by a different part of the first electrode plate relative to the second electrode plate.

Specifically, after acquiring the detectable first cell image, the first cell image is input into the first training model for detection processing, and the first training model outputs the region of interest corresponding to the first cell image according to the data of the first cell image. Because the lengths of the electrode plates with different polarities are different, there is a difference between the first electrode plate and the second electrode plate after the cell is manufactured, and when the length of the first electrode plate is greater than that of the second electrode plate, the different part is the part where the first electrode plate protrudes from the second electrode plate. It may be seen that the main purpose of this step is to detect the region formed by the different part of the first electrode plate relative to the second electrode plate, that is, the region of interest. The data used to calculate the cell alignment metric can be obtained through the region of interest.

It should be noted that the first training model is a model obtained through deep learning, which is used to perform detection processing on the first cell image, and obtain the region formed by the different part of the first electrode plate relative to the second electrode plate in the cell, that is, the region of interest.

At step S300, a second cell image and terminal position information of the second electrode plate are obtained according to the region of interest and the first cell image.

Specifically, by combining the region of interest output by the first training model with the first cell image, the second cell image corresponding to the region of interest in the first cell image can be obtained, and the terminal position information of the second electrode plate can also be determined according to the region of interest combined with the first cell image.

In an embodiment, firstly, the region of interest output by the first training model is filtered to effectively remove burrs in the original region of interest to obtain the filtered region of interest. Then, a maximum contour of the filtered region of interest is acquired, and image inversion processing is performed on the region of interest with the maximum contour to obtain the region of interest after image inversion, wherein an inside of the region of interest is set to 0 and an outside of the region of interest is set to 255. Bitwise OR operation is performed on the region of interest after image inversion and the first cell image to obtain the second cell image. Consequently, the obtained second cell image is the image corresponding to the region of interest in the first cell image. After a series of processing of filtering, maximum contour and inversion is performed on the region of interest, a more accurate region of interest can be obtained, so that a more accurate second cell image can be extracted from the first cell image, and more accurate terminal position information of the second electrode plate can be determined from the first cell image.

At step S400, the second cell image is input into a second training model for separation processing to obtain a third cell image and terminal position information of the first electrode plate is obtained according to the third cell image and the first cell image.

Specifically, the second cell image is input into the second training model, which is a model obtained through deep learning. This model is used to separate the second cell image to obtain each independent first electrode plate in the region of interest, and then the second training model may output the third cell image, which is a binary image with the same size as the electrode plate in the region of interest of the first cell image, so that a specific coordinate position in the first cell image, i.e., the terminal position information of the first electrode plate, can be determined according to the point of the third cell image.

At step S500, image extraction and analysis are performed on the third cell image to obtain a misalignment quantity between the first electrode plate and the adjacent second electrode plate.

In an embodiment, image extraction is performed on the third cell image comprising a plurality of partial images of the first electrode plate (that is, the different part of the first electrode plate relative to the second electrode plate) to obtain a circumscribed rectangle of each first electrode plate in the third cell image, which is usually a minimum circumscribed rectangle. Certainly, a size of the circumscribed rectangle may also be slightly adjusted according to the actual situation, and then the misalignment quantity between the first electrode plate and the adjacent second electrode plate can be obtained according to the circumscribed rectangle. It may be understood that since the electrode plate in the first cell image is a cell image in which the first electrode plate and the second electrode plate are alternately laminated, and the circumscribed rectangle of the first electrode plate in the third cell image obtained from the first cell image presents a long strip shape, then a length value of a long side of the circumscribed rectangle may be taken as the misalignment quantity between the first electrode plate and the adjacent second electrode plate.

In an embodiment, image contour extraction is performed on the third cell image first to obtain a contour of each first electrode plate in the third cell image, and then the circumscribed rectangle corresponding to the contour of the first electrode plate is generated according to the contour of the first electrode plate, and the misalignment quantity between the first electrode plate and the adjacent second electrode plate can be obtained according to the length value of the long side of the circumscribed rectangle. It may be understood that the size of the circumscribed rectangle corresponding to each contour may be the same or different.

In an embodiment, image contour extraction is performed on the third cell image first to obtain a contour of each first electrode plate in the third cell image, and then the circumscribed rectangle corresponding to the contour of the first electrode plate is generated according to the contour of the first electrode plate, then a target point is determined according to the circumscribed rectangle, and the misalignment quantity between the first electrode plate and the adjacent second electrode plate corresponding to the circumscribed rectangle is calculated according to position information corresponding to the target point. It should be noted that the target point may be a midpoint of two short sides of the circumscribed rectangle, or may be other midpoint of the two short sides of the circumscribed rectangle near the midpoint, and may be set according to actual situations.

In an embodiment, image contour extraction is performed on the third cell image first to obtain the contour of each first electrode plate in the third cell image, then the circumscribed rectangle corresponding to the contour of the first electrode plate is generated according to the contour of the first electrode plate, then vertex position information of the circumscribed rectangle is determined according to the circumscribed rectangle, and midpoint position information of two target edges of the circumscribed rectangle is determined according to the vertex position information, wherein a direction of the target edges is the same as a laminating direction of the first electrode plate and the second electrode plate, and the midpoint position information is determined as the target point. For example, after the circumscribed rectangle with the minimum contour is acquired, four vertices of the minimum circumscribed rectangle are taken out and sorted, and midpoints of four sides are respectively obtained through the four vertices. Midpoints of left and right ends of the position of the first electrode plate and the position of the adjacent second electrode plate are compared to obtain a misalignment quantity, that is, a length of the circumscribed rectangle may represent a distance between the first electrode plate and the second electrode plate.

At step S600, the cell alignment metric is obtained according to the terminal position information of the second electrode plate, the terminal position information of the first electrode plate and the misalignment quantity.

Specifically, by processing the first cell image through the first training model and the second training model, the positions of the positive plate and the negative plate can be accurately positioned, that is, the accurate terminal position information of the second electrode plate, terminal position information of the first electrode plate and misalignment quantity of the first electrode plate and the second electrode plate can be obtained from the first cell image, so that the accuracy of cell alignment metric detection can be effectively improved.

Figure 3:
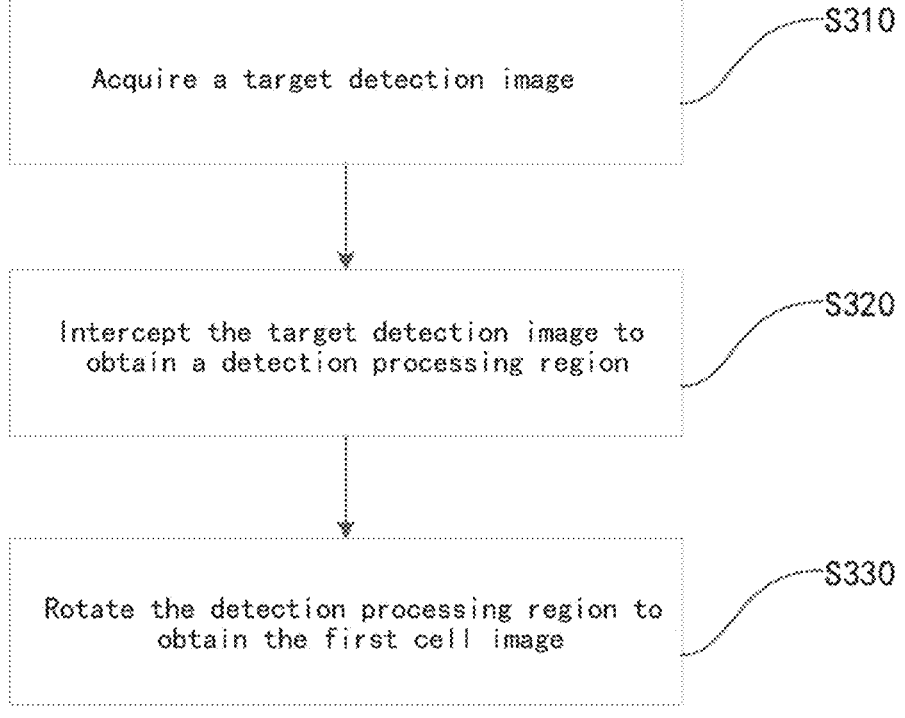
FIG. 3 is a flow chart of a cell alignment metric detection method provided by another embodiment of the present disclosure.

Referring to FIG. 3, FIG. 3 is a flow chart of a cell alignment metric detection method provided by another embodiment of the present disclosure. Before the step S100, the method may comprise, but is not limited to step S310, step S320 and step S330.

At step S310, a target detection image is acquired.

Specifically, the target detection image may be a detection image that meets basic detection requirements after preliminary screening, or may be a detection image that meets the basic detection requirements stored in a memory.

In an embodiment, cell alignment metric detection is a process of performing real-time detection on each cell. Then, a target cell to be detected is photographed by an image acquisition module. In order to reduce an error rate of the photographing step, a plurality of images are usually acquired by photographing to obtain an initial image set of the cell, and then average gray judgment processing is performed on the initial images in the initial image set to obtain the target detection image. This step can filter out incorrect images obtained in an imaging process of the image acquisition module. For example, sometimes the initial image read is a completely black image, so this step may be used to filter out the incorrect image of an x-ray device.

In an embodiment, cell alignment metric detection is a process of detecting a batch of batteries, and then the target detection images are target detection images obtained by screening the shot initial images of the cell after the average gray judgment processing, and the plurality of target detection images are stored in a memory in a certain order.

It should be noted that the image acquisition module may be an x-ray device or a photographic device, and is not limited in this embodiment.

At step S320, intercepting is performed according to the target detection image to obtain a detection processing region.

Specifically, the acquired target detection image is intercepted, and the points that can be intercepted may be manually selected or fixed points, for example, [x, y, width, height] [300,300,900,700]; and for another example, [x, y, width, height] [250,250,950,600]. The points may be determined according to the actual situation, and is not specifically limited in this embodiment.

At step S330, the detection processing region is rotated to obtain the first cell image.

Specifically, after the detection processing region is intercepted, in order to facilitate subsequent detection processing and judgment, the detection processing region may be rotated, for example, the detection processing region may be rotated by 270 degrees; and for another example, the detection processing region is rotated by 90 degrees. The rotating degree may be set according to the actual situation, and is not specifically limited in this embodiment.

Figure 4:
FIG. 4 is a flow chart of a cell alignment metric detection method provided by another embodiment of the present disclosure.

As shown in FIG. 4, FIG. 4 is a flow chart of a cell alignment metric detection method provided by another embodiment of the present disclosure. The steps of the embodiment of the present disclosure comprise, but is not limited to, step S410, step S420, step S430 and step S440.

Figure 5:
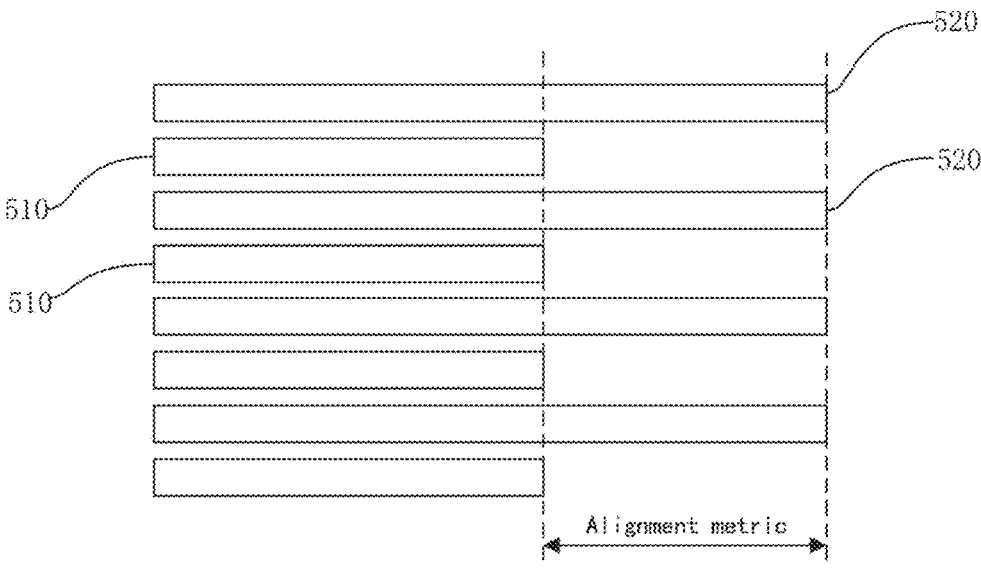
FIG. 5 is a schematic diagram of a cell provided by another embodiment of the present disclosure.
Figure 6:
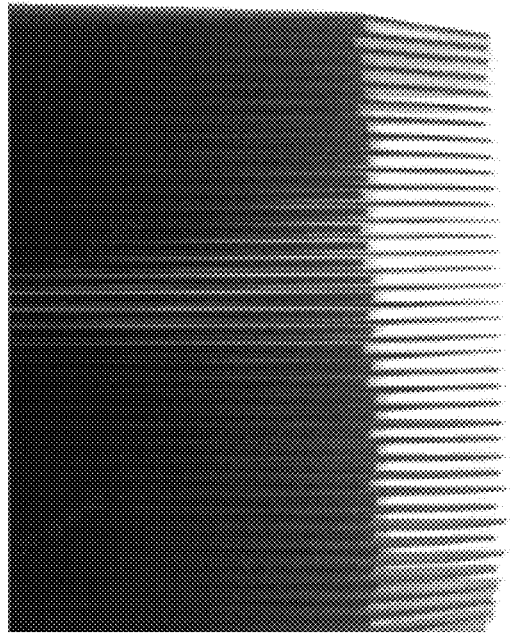
FIG. 6 is a schematic diagram of a first cell image provided by an embodiment of the present disclosure.
Figure 7:
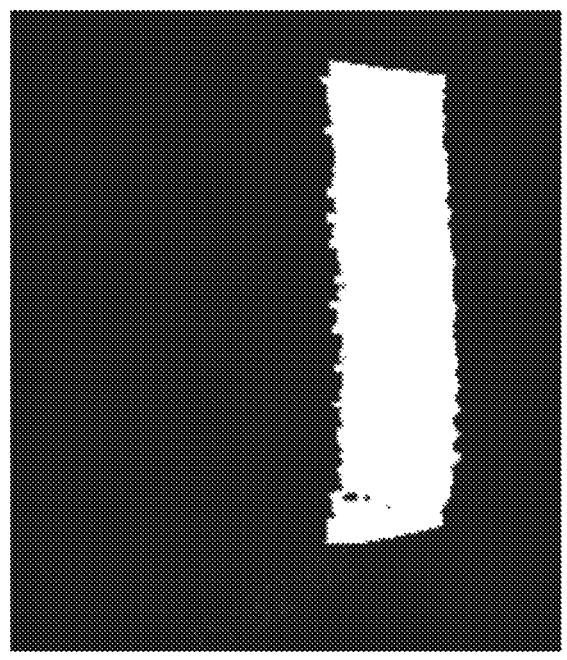
FIG. 7 is a schematic diagram of a region of interest provided by an embodiment of the present disclosure.
Figure 8:
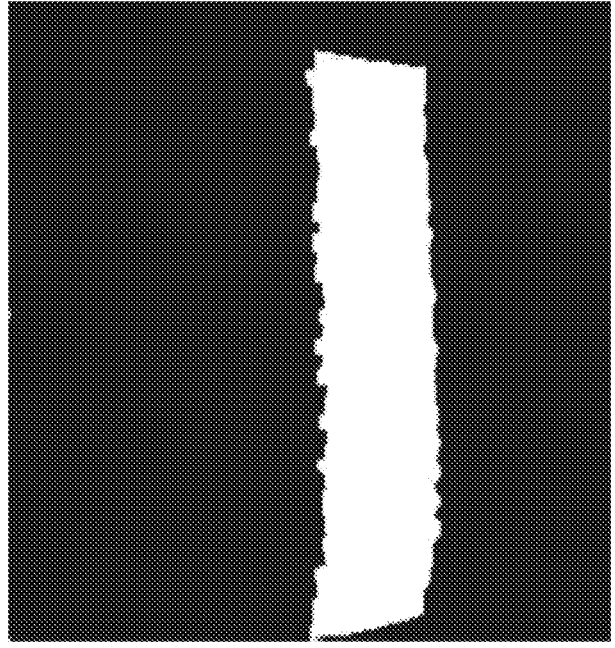
FIG. 8 is a schematic diagram of a maximum contour of the region of interest provided by an embodiment of the present disclosure.
Figure 9:
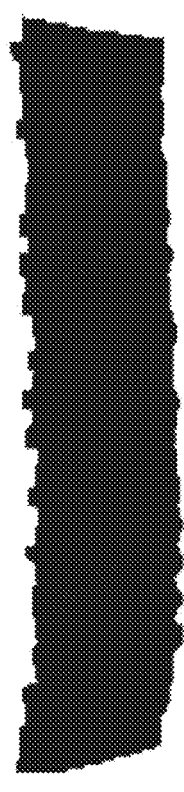
FIG. 9 is a schematic diagram of the region of interest after image inversion provided by an embodiment of the present disclosure.
Figure 10:
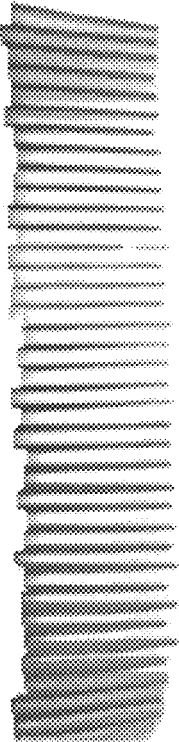
FIG. 10 is a schematic diagram of a second cell image provided by an embodiment of the present disclosure.
Figure 11:
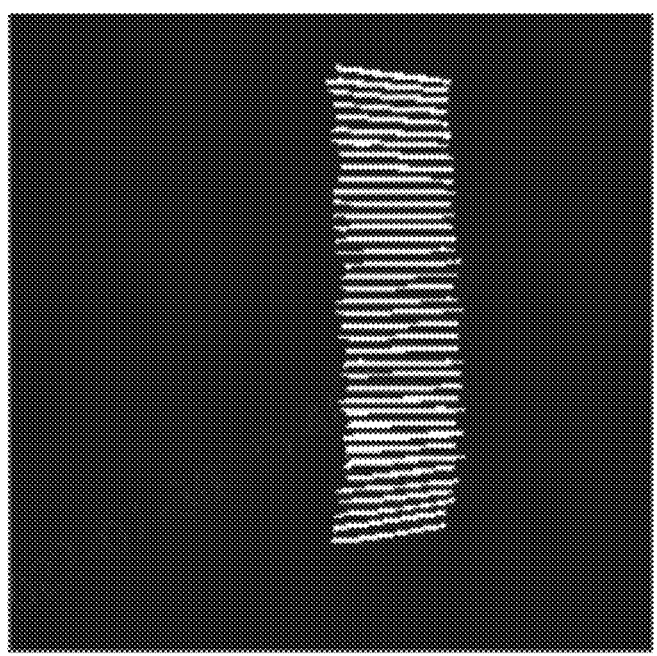
FIG. 11 is a schematic diagram of a third cell image provided by an embodiment of the present disclosure.

At step S410: reading initial images of a cell to be detected from an x-ray device (as shown in FIG. 5, under normal circumstances, the cell comprises a plurality of positive plates 510 and a plurality of negative plates 520, and the positive plates 510 and the negative plates 520 are alternately laminated, and a length of the positive plate 510 is different from that of the negative plate 520. When the cell is assembled, a head of the positive plate 510 is flush with a head of the negative plate 520, When a length of the negative plate 520 is greater than that of the positive plate 510, the negative plate 520 may partially protrude from the positive plate 510, and a length of the protruding portion is the alignment metric to be detected);

step S420: performing average gray judgment on the initial images to obtain a target detection image;

step S430: intercepting a detection processing area from the target detection image;

step S440: rotating the detection processing region by a preset angle to obtain the first cell image, as shown in FIG. 6;

step S450: converting the first cell image into a grayscale;

step S460: inputting the first cell image converted into the grayscale into a first training model for detection processing to obtain a region of interest, as shown in FIG. 7 (terminal position information of the positive plate may be acquired through FIG. 7);

step S470: filtering the first cell image converted into the grayscale to remove a burr of the first cell image;

step S480: obtaining a maximum contour of the region of interest, as shown in FIG. 8;

step S490: performing image inversion processing on the maximum contour of the region of interest to obtain the region of interest after image inversion, as shown in FIG. 9, wherein an inside of the region of interest is 0, and an outside of the region of interest is 255;

step S500: performing bitwise OR operation on the region of interest after image inversion and the first cell image to obtain a second cell image (the second cell image is the image corresponding to the region of interest in the first cell image), as shown in FIG. 10;

Step S510: inputting the second cell image into a second training model for separation processing to obtain a third cell image, as shown in FIG. 3 (the terminal position information of the negative plate may be obtained from the third cell image and the first cell image).

step S520: binarizing the third cell image to obtain a binary image consistent with a size of the first cell image (the binary image and the third cell image may be combined to obtain the specific coordinate position of the point of the third cell image in the first cell image);

step S530: filtering the binarized third cell image to remove noise;

step S540: acquiring a contour of each negative plate in the third cell image, sorting by Y value, and each first electrode plate in the third cell image is labeled (i.e., each white horizontal line in the third cell image is labeled).

step S550: traversing each contour, the number of the contour being the number of negative plates, and calculating the number of positive plates and the total number of electrode plates according to the number of negative plates (since the positive plate is one less than the negative plate, the number of the positive plates and the total number of plates can be calculated synchronously).

step S560: acquiring the contour of the negative plate to generate a minimum circumscribed rectangle of the circumscribed rectangle corresponding to the contour;

step S580: respectively obtaining midpoints of four edges through four vertexes of the minimum circumscribed rectangle;

step S590: comparing midpoints of left and right ends of adjacent positions to obtain a misalignment quantity of adjacent electrode plates (the adjacent electrode plates refer to one positive plate and one negative plate, and the misalignment quantity is a length of the rectangle, that is, a distance between the positive and negative plates); and step S600: obtaining the cell alignment metric according to the terminal position information of the positive plate, the terminal position information of the negative plate and the misalignment quantity.

In the technical solution of this embodiment, by processing the first cell image through the first training model and the second training model, the positions of the positive plate and the negative plate can be accurately positioned, that is, the accurate terminal position information of the second electrode plate, terminal position information of the first electrode plate and misalignment quantity of the first electrode plate and the second electrode plate can be obtained from the first cell image, so that the accuracy of cell alignment metric detection can be effectively improved.

Moreover, an embodiment of the present application provides a controller. The controller comprises: a memory, a processor and a computer program stored on the memory and operatable on the processor. The processor and the memory may be connected by a bus or other means. It should be noted that the controller in this embodiment may correspondingly comprise the memory and the processor in the embodiment shown in FIG. 1, and can constitute a part of the system architecture platform in the embodiment shown in FIG. 1; the two belong to the same inventive concept, so the two have the same implementation principle and beneficial effects, which will not be described in detail here.

Non-transient software programs and instructions required to implement the cell alignment metric detection method of the embodiment in the controller side are stored in the memory which, when executed by the processor, perform the cell alignment metric detection method of the above embodiment, for example, perform the above-described method steps S100 to S600 in FIG. 2, method steps S310 to S330 in FIG. 3, and method steps S410 to S600 in FIG. 4.

Moreover, an embodiment of the present application further provides a detection system comprising the controller in the foregoing embodiment, the implementation principle and beneficial effects of which are consistent with those of the controller, which will not be described in detail here.

Moreover, an embodiment of the present application further provides a computer-readable storage medium. The computer-readable storage medium stores a computer-executable instruction which is used for performing the cell alignment metric detection method above, for example, executing the above-described method steps S100 to S600 in FIG. 2, the method steps S310 to S330 in FIG. 3, and the method steps S410 to S600 in FIG. 4.

Those of ordinary skills in the art will appreciate that all or some of the steps and systems in the methods disclosed above may be implemented as software, firmware, hardware, and suitable combinations thereof. Some physical components or all of the physical components may be implemented as software executed by a processor, such as a central processing unit, a digital signal processor or a microprocessor, or implemented as hardware, or implemented as an integrated circuit, such as an application specific integrated circuit. Such software may be distributed on a computer-readable medium, and the computer-readable medium may include a computer storage medium (or non-transitory medium) and a communication medium (or transitory medium). As well known to those of ordinary skills in the art, the term computer storage medium includes volatile and non-volatile, removable and non-removable media implemented in any method or art for storing information (such as computer-readable instruction, data structure, programming module or other data). The computer storage medium includes, but is not limited to, RAM, ROM, EEPROM, flash memory or other memory technology, CD-ROM, digital versatile disc (DVD) or other optical disc memory, magnetic cassette, magnetic tape, magnetic disk memory or other magnetic memory device, or may be any other medium that can be used to store the desired information and can be accessed by a computer. Moreover, it is well known to those of ordinary skills in the art that the communication medium typically includes computer-readable instructions, data structures, program modules, or other data in a modulated data signal, such as a carrier wave or other transmission mechanism, and may include any information delivery medium. It should be noted that the computer-readable storage medium may be non-volatile or volatile.

The foregoing describes the preferred embodiments of the present application in detail, but the embodiments of the present application are not limited to the foregoing embodiments. Those of ordinary skills in the art can make various equal deformations or replacements without departing from the spirit of the embodiments of the present application, and these equal deformations or replacements shall all fall within the scope limited by the claims of the embodiments of the present application.

What is claimed is:

1. A cell alignment metric detection method, comprising:

acquiring a first cell image, wherein the first cell image is a cell image in which a first electrode plate and a second electrode plate are alternately laminated;

inputting the first cell image into a first training model for detection processing to obtain a region of interest, wherein the region of interest is a region formed by a different part of the first electrode plate relative to the second electrode plate;

obtaining a second cell image and terminal position information of the second electrode plate according to the region of interest and the first cell image;

inputting the second cell image into a second training model for separation processing to obtain a third cell image and obtaining terminal position information of the first electrode plate according to the third cell image and the first cell image;

performing image extraction and analysis on the third cell image to obtain a misalignment quantity between the first electrode plate and the adjacent second electrode plate; and obtaining the cell alignment metric according to the terminal position information of the second electrode plate, the terminal position information of the first electrode plate and the misalignment quantity;

wherein performing the image extraction and analysis on the third cell image to obtain the misalignment quantity between the first electrode plate and the adjacent second electrode plate comprises:

performing image extraction on the third cell image to obtain a circumscribed rectangle of each first electrode plate in the third cell image; and obtaining the misalignment quantity between the first electrode plate and the adjacent second electrode plate according to the circumscribed rectangle;

wherein performing the image extraction on the third cell image to obtain the circumscribed rectangle of each first electrode plate in the third cell image comprises:

performing image contour extraction on the third cell image to obtain a contour of each first electrode plate in the third cell image; and generating the circumscribed rectangle corresponding to the contour of the first electrode plate according to the contour of the first electrode plate.

2. The cell alignment metric detection method of claim 1, wherein obtaining the misalignment quantity between the first electrode plate and the adjacent second electrode plate according to the circumscribed rectangle comprises:

determining a target point according to the circumscribed rectangle; and calculating to obtain the misalignment quantity between the first electrode plate and the adjacent second electrode plate corresponding to the circumscribed rectangle according to position information corresponding to the target point.

3. The cell alignment metric detection method of claim 2, wherein determining the target point according to the circumscribed rectangle comprises:

determining vertex position information of the circumscribed rectangle according to the circumscribed rectangle;

determining midpoint position information of two target edges of the circumscribed rectangle according to the vertex position information, wherein a direction of the target edges is the same as a laminating direction of the first electrode plate and the second electrode plate; and determining the midpoint position information as the target point.

4. The cell alignment metric detection method of claim 1, wherein after performing the image contour extraction on the third cell image to obtain the contour of each first electrode plate in the third cell image, the method further comprises:

labeling the contour of the first electrode plate to obtain a number of the first electrode plate;

obtaining a number of the second electrode plate according to the number of the first electrode plate; and obtaining a total number of electrode plates of the cell in the first cell image according to the number of the first electrode plate and the number of the second electrode plate.

5. The cell alignment metric detection method of claim 1, wherein obtaining the second cell image according to the region of interest and the first cell image comprises:

filtering the region of interest to obtain a filtered region of interest;

acquiring a maximum contour of the filtered region of interest, and performing image inversion processing on the region of interest to obtain the region of interest after image inversion; and performing bitwise OR operation on the region of interest after image inversion and the first cell image to obtain the second cell image.

6. The cell alignment metric detection method of claim 1, wherein before acquiring the first cell image, the method comprises:

acquiring a target detection image;

intercepting the target detection image to obtain a detection processing region; and rotating the detection processing region to obtain the first cell image.

7. The cell alignment metric detection method of claim 6, wherein before acquiring the target detection image, the method comprises:

acquiring an initial image set obtained by shooting a cell through an image acquisition module; and performing average gray judgment processing on initial images of the initial image set to obtain the target detection image.

8. A controller, comprising: a memory, a processor, and a computer program stored in the memory and executable on the processor, wherein the processor, when executing the computer program, implements a cell alignment metric detection method comprising:

acquiring a first cell image, wherein the first cell image is a cell image in which a first electrode plate and a second electrode plate are alternately laminated;

inputting the first cell image into a first training model for detection processing to obtain a region of interest, wherein the region of interest is a region formed by a different part of the first electrode plate relative to the second electrode plate;

obtaining a second cell image and terminal position information of the second electrode plate according to the region of interest and the first cell image;

inputting the second cell image into a second training model for separation processing to obtain a third cell image and obtaining terminal position information of the first electrode plate according to the third cell image and the first cell image;

performing image extraction and analysis on the third cell image to obtain a misalignment quantity between the first electrode plate and the adjacent second electrode plate; and obtaining the cell alignment metric according to the terminal position information of the second electrode plate, the terminal position information of the first electrode plate and the misalignment quantity;

wherein performing the image extraction and analysis on the third cell image to obtain the misalignment quantity between the first electrode plate and the adjacent second electrode plate comprises:

performing image extraction on the third cell image to obtain a circumscribed rectangle of each first electrode plate in the third cell image; and obtaining the misalignment quantity between the first electrode plate and the adjacent second electrode plate according to the circumscribed rectangle;

wherein performing the image extraction on the third cell image to obtain the circumscribed rectangle of each first electrode plate in the third cell image comprises:

performing image contour extraction on the third cell image to obtain a contour of each first electrode plate in the third cell image; and generating the circumscribed rectangle corresponding to the contour of the first electrode plate according to the contour of the first electrode plate.

9. A detection system, comprising: the controller of claim 8.

10. The controller of claim 8, wherein obtaining the misalignment quantity between the first electrode plate and the adjacent second electrode plate according to the circumscribed rectangle comprises:

determining a target point according to the circumscribed rectangle; and calculating to obtain the misalignment quantity between the first electrode plate and the adjacent second electrode plate corresponding to the circumscribed rectangle according to position information corresponding to the target point.

11. The controller of claim 10, wherein determining the target point according to the circumscribed rectangle comprises:

determining vertex position information of the circumscribed rectangle according to the circumscribed rectangle;

determining midpoint position information of two target edges of the circumscribed rectangle according to the vertex position information, wherein a direction of the target edges is the same as a laminating direction of the first electrode plate and the second electrode plate; and determining the midpoint position information as the target point.

12. The controller of claim 8, wherein after performing the image contour extraction on the third cell image to obtain the contour of each first electrode plate in the third cell image, the method further comprises:

labeling the contour of the first electrode plate to obtain a number of the first electrode plate;

obtaining a number of the second electrode plate according to the number of the first electrode plate; and obtaining a total number of electrode plates of the cell in the first cell image according to the number of the first electrode plate and the number of the second electrode plate.

13. The controller of claim 8, wherein obtaining the second cell image according to the region of interest and the first cell image comprises:

filtering the region of interest to obtain a filtered region of interest;

acquiring a maximum contour of the filtered region of interest, and performing image inversion processing on the region of interest to obtain the region of interest after image inversion; and performing bitwise OR operation on the region of interest after image inversion and the first cell image to obtain the second cell image.

14. The controller of claim 8, wherein before acquiring the first cell image, the method comprises:

acquiring a target detection image;

intercepting the target detection image to obtain a detection processing region; and rotating the detection processing region to obtain the first cell image.

15. The controller of claim 14, wherein before acquiring the target detection image, the method comprises:

acquiring an initial image set obtained by shooting a cell through an image acquisition module; and performing average gray judgment processing on initial images of the initial image set to obtain the target detection image.

16. A non-transitory computer-readable storage medium storing a computer-executable instruction, wherein the computer is used for performing a cell alignment metric detection method comprising:

acquiring a first cell image, wherein the first cell image is a cell image in which a first electrode plate and a second electrode plate are alternately laminated;

inputting the first cell image into a first training model for detection processing to obtain a region of interest, wherein the region of interest is a region formed by a different part of the first electrode plate relative to the second electrode plate;

obtaining a second cell image and terminal position information of the second electrode plate according to the region of interest and the first cell image;

inputting the second cell image into a second training model for separation processing to obtain a third cell image and obtaining terminal position information of the first electrode plate according to the third cell image and the first cell image;

performing image extraction and analysis on the third cell image to obtain a misalignment quantity between the first electrode plate and the adjacent second electrode plate; and obtaining the cell alignment metric according to the terminal position information of the second electrode plate, the terminal position information of the first electrode plate and the misalignment quantity;

wherein performing the image extraction and analysis on the third cell image to obtain the misalignment quantity between the first electrode plate and the adjacent second electrode plate comprises:

performing image extraction on the third cell image to obtain a circumscribed rectangle of each first electrode plate in the third cell image; and obtaining the misalignment quantity between the first electrode plate and the adjacent second electrode plate according to the circumscribed rectangle;

wherein performing the image extraction on the third cell image to obtain the circumscribed rectangle of each first electrode plate in the third cell image comprises:

performing image contour extraction on the third cell image to obtain a contour of each first electrode plate in the third cell image; and generating the circumscribed rectangle corresponding to the contour of the first electrode plate according to the contour of the first electrode plate.

* * * * *